United States Patent

[11] 3,610,681

| [72] | Inventor | Werner Trenkler |
| | | Im Taschen, Germany |
| [21] | Appl. No. | 826,451 |
| [22] | Filed | May 21, 1969 |
| [45] | Patented | Oct. 5, 1971 |
| [73] | Assignee | Firma Dr.-Ing. h. c. F. Porsche KG |
| | | Stuttgart-Zuffenhausen, Germany |
| [32] | Priority | May 31, 1968 |
| [33] | | Germany |
| [31] | | G 17 55 619.3 |

[54] AUTOMOTIVE VEHICLE BODY WITH DETACHABLE ROOF SECTION
10 Claims, 5 Drawing Figs.

[52] U.S. Cl. .................................................. 296/137 R,
24/68, 49/465, 292/113, 292/202
[51] Int. Cl. ........................................................ B60j 7/10
[50] Field of Search............................................ 280/150 C;
296/121, 137 A, 137 B, 137 H; 49/463, 465;
292/95, 96, 101, 113, 194, 195, 202, DIG. 4, DIG.
31, DIG. 49; 24/68, 270-273

[56] References Cited
UNITED STATES PATENTS

| 1,702,507 | 2/1929 | Hennicke..................... | 292/101 X |
| 2,580,336 | 12/1951 | Votypka...................... | 296/137 |
| 2,712,955 | 7/1955 | Andrews...................... | 292/113 |
| 3,216,763 | 11/1965 | Heincelman.................. | 296/121 |
| 3,476,437 | 11/1969 | Schroeder et al............. | 296/137 |
| 3,494,659 | 2/1970 | Trenkler....................... | 296/137 |

FOREIGN PATENTS

| 543,519 | 12/1955 | Belgium ...................... | 296/137 |

*Primary Examiner*—Benjamin Hersh
*Assistant Examiner*—Leslie J. Paperner
*Attorney*—Craig, Antonelli & Hill ABSTRACT: An automotive vehicle body provided with a detachable roof section and means provided at the windshield frame and the forward edge of the detachable roof section associated therewith for releasably securing the roof section along the windshield frame, including tension-locking devices exerting clamping forces effective in a direction substantially parallel to the plane of the roof section. Additionally, the present invention contemplates means provided upon a relatively fixed, self-supporting roll yoke and the rear portion of the detachable roof section associated therewith for detachably securing the roof section along the roll yoke, which means include clamping locks exerting a clamping force effective in a direction substantially at right angles to the plane of the roof section.

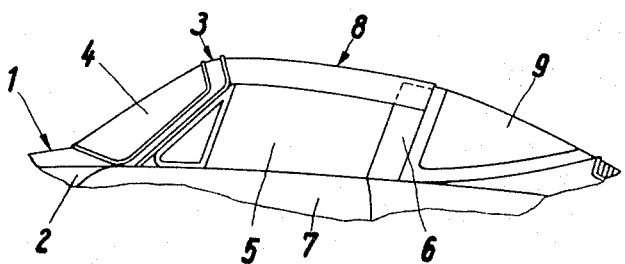
Fig.1
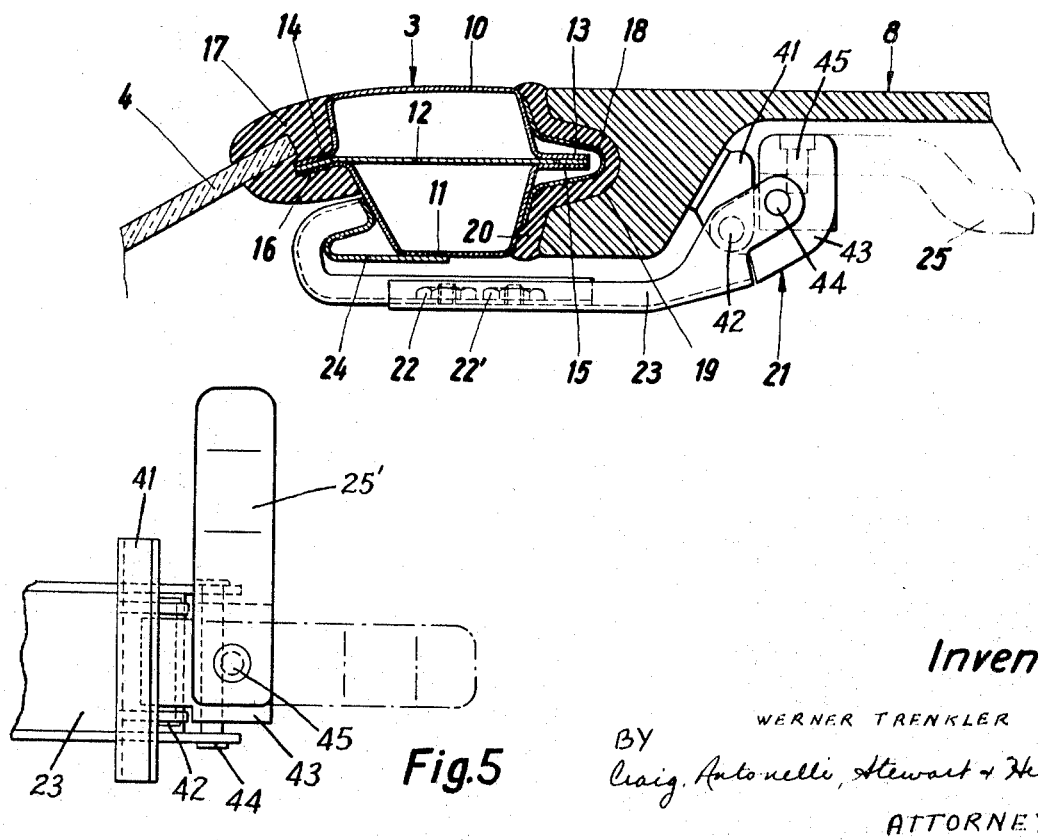
Fig.2
Fig.5
Inventor:
WERNER TRENKLER
BY
Craig, Antonelli, Stewart & Hill
ATTORNEYS 3,610,681

AUTOMOTIVE VEHICLE BODY WITH DETACHABLE ROOF SECTION

BACKGROUND OF THE INVENTION

The present invention pertains to automotive vehicle bodies, particularly passenger vehicles, having a roll yoke spanning the passenger compartment in a self-supporting manner and having a detachable roof section adapted to be releasably secured at the windshield frame and at the roll yoke by means of tension-locking devices.

Conventionally, automotive vehicles have been provided with detachable roof sections releasably secured to various portions of the vehicle superstructure. In order to accomplish the desired detachable connection of the roof section and the vehicle superstructure, however, complex, heavy, and, accordingly, expensive fastening means have been required.

Accordingly, it is an object of the present invention to provide an arrangement of the detachable roof section and the portions of the vehicle superstructure to which the roof section is to be secured which is better adapted to the stresses incurred during driving of the vehicle.

Further, it is an object of the present invention to provide a detachable roof section and mounting means therefor which provide an effective and secure interconnection of the roof section and the vehicle superstructure without the use of the complex and heavy locking devices employed heretofore.

Finally, it is an object of the present invention to provide a detachable roof section for an automotive vehicle and mounting means therefor utilizing relatively simple and light locking devices, which locking devices are relatively inexpensive to produce and both simple and reliable in operation.

SUMMARY OF THE INVENTION

The aforementioned objectives are accomplished, in accordance with the present invention, by providing clamping or locking devices between the forward portion of the detachable roof section and the windshield frame of the vehicle which exert clamping forces effective in a direction substantially parallel to the plane of the roof section. In combination with the locking arrangement described above at the forward portion of the roof section, the present invention contemplates the use of tension-locking devices for securing the rear portion of the detachable roof section at the self-supporting roll yoke of the vehicle body, which locking devices exert clamping forces effective in a direction extending substantially at right angles to the plane of the roof section.

More specifically, the windshield frame and the detachable roof section are provided with mating sections facilitating an interlocking connection. By means of the interlocking cooperation of the windshield frame and the detachable roof section and by the incorporation of well-designed effective clamping locks, a secure mounting of the detachable roof section can be accomplished in a relatively simple manner.

The windshield frame, in accordance with the present invention, includes a ridge and the detachable roof section includes a groove, which ridge and groove cooperate to engage a resilient sealing element interposed therebetween. In this manner, a firm support of the detachable roof section at the windshield frame, effective to withstand the relatively high vacuum pressure forces occurring during driving of the vehicle is accomplished.

The tension locking devices at the windshield frame include a tensioning member cooperating with a stop member attached at the windshield frame facing the windshield. The use of such a structural member precludes an unintentional release of the tension locking devices, which might otherwise be caused by vibrations or the like generated by the motion of the vehicle. The stop member preferably is provided in the form of a stamped sheet metal angle. In order to compensate for the manufacturing tolerances required in the mating ridge provided on the windshield frame and the groove provided in the roof section, the tensioning members of the clamping devices are preferably constructed so as to be adjustable in length.

The tension lock device contemplated by the present invention for securing the detachable roof section at the roll yoke is preferably formed from an elastic material and includes an expansible section in its direction of effective force. In this manner, an effective clamping lock is achieved in an extremely inexpensive design. The clamping lock, which is adapted to engage with a fishplate provided at the roll yoke includes two parts interconnected by means of a threaded connection. Thus, the tension of the clamping lock can be simply adjusted to a desired magnitude.

BRIEF DESCRIPTION OF THE DRAWINGS

The foregoing objects, features and advantages of the present invention will become more readily apparent from a consideration of the detailed description hereinbelow, when considered in conjunction with the accompanying drawings, wherein:

FIG. 1 represents a lateral view of a roof construction of an automotive vehicle in accordance with the present invention;

FIG. 2 represents a section through the windshield frame of the vehicle according to FIGURE 1 on an enlarged scale;

FIG. 5 is a plan view of the tension-locking device at the windshield shown in FIG. 2.

DETAILED DESCRIPTION OF THE DRAWINGS

Figure 3:
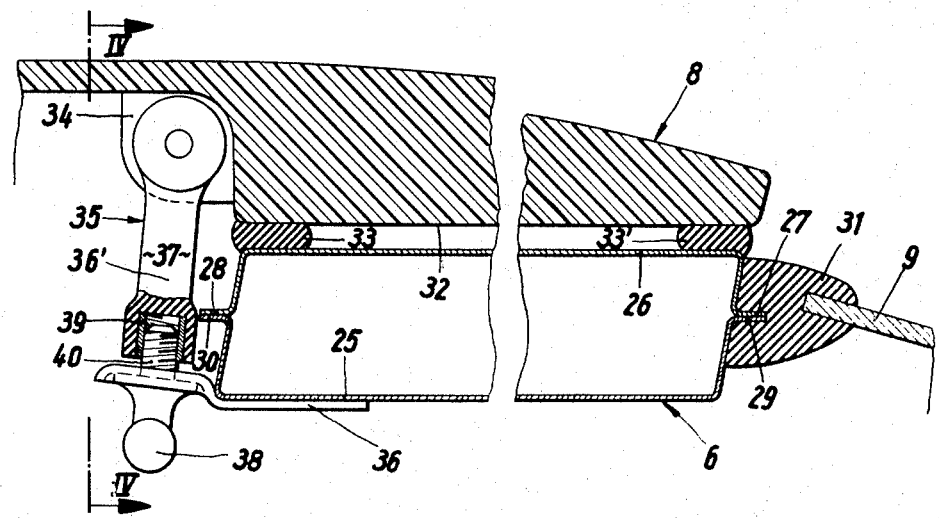
FIG. 3 represents a section through the detachable roof section in the region of the roll yoke, on an enlarged scale.
Figure 4:
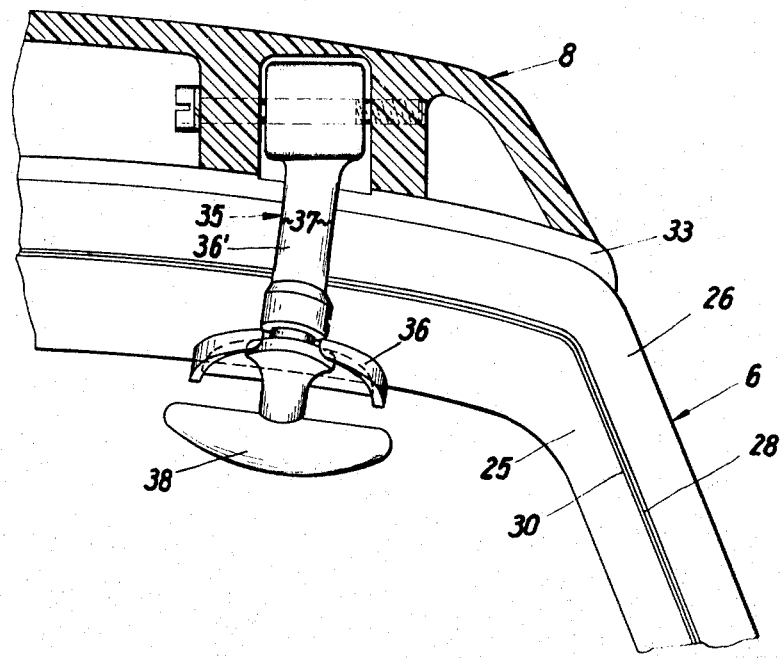
FIG. 4 represents a section along line IV—IV of FIG. 3.

In the region illustrated in FIG. 1, the automotive vehicle 1 includes a fixed superstructure 2 to which a frame 3 for a windshield 4, as well as a roll yoke 6 freely spanning a passenger compartment 5, are rigidly secured. The passenger compartment 5 is accessible through a door 7 and is covered, between the windshield frame 3 and the roll yoke 6 by a detachable roof section 8. A rear window 9 is provided for covering the rear portion of the passenger compartment 5.

The windshield frame 3, as seen particularly in FIGURE 2, is constructed in the form of stamped sheet metal parts 10 and 11 and a reinforcing member 12. The stamped sheet metal parts 10 and 11 are interconnected, at flanges 13, 14, 15, and 16, by spot-welding, with the reinforcing member 12 interposed therebetween. The flanges 14 and 16 are surrounded by a sealing gasket 17 which retains the windshield 4 in position. On the side of the windshield frame 3 facing the passenger compartment 5, a ridge 18 is spot-welded to the stamped sheet metal parts 10 and 11. The detachable roof section 8 in the region opposite the windshield frame 3 in the upper zone thereof is constructed, for example, from a synthetic material and includes a groove 19 which cooperates with the ridge 18 of the windshield frame 3, the groove 19 and ridge 18 securing therebetween a resilient sealing member 20.

In order to secure the roof section 8 at the windshield frame 3, the windshield frame 3 is provided with a tension-locking device 21. The locking device 21 includes a bipartite tensioning member 23 which can be adjusted longitudinally by means of a sleeve nut 22, 22'; the tensioning member 23 cooperates with a stop member 24 attached to the stamped sheet metal part 11 of the windshield frame 3. A handle 25' is provided for operating the locking device 21. A bearing part 41 adjacent the tensioning member 23 and the handle 25' is held at the roof section 8 by conventional means such as threaded members, cement or the like. An operating member 43 is connected to the bearing part 41 by bearing pins 42 at which the tensioning member 23 is pivotally held by means of bearing pins 44. The handle 25' is pivotally held on the operation member 43 by threaded element 45. The handle 25' which can be pivoted into the in-use position shown in dot-dash lines in FIG. 2 and thereafter pivoted into the rest position extending at a right angle to the longitudinal direction of the vehicle as shown in solid lines in FIG. 5 is simply pivoted downwardly in order to release the tensioning force. In the closed position, the locking device 21 assumes a dead center position.

The roll yoke 6, as seen in FIGURE 3, primarily constitutes a box-shaped girder formed from deep-drawn sheet metal parts 25 and 26. The girder spans the passenger compartment 5 in the manner of a self-supporting arch. The sheet metal parts 25 and 26 are provided with flange portions 27, 28, 29 and 30 which interconnected with one another by spot-welding. At the side of the roll yoke 6 facing the rear window 9 of the vehicle 1, a sealing rubber profiled member 31 is provided. The rubber member 31 includes a channel surrounding the interconnected flange portions 27 and 29 of the sheet metal parts 25 and 26 of the roll yoke 6 and further serves to retain the rear window 9 in position.

The detachable roof section 8 includes, in its rearward portion, a girderlike section 32 which is designed to engage with sheet metal part 26 of roll yoke 6 by means of the sealing members 33 and 33' interposed between the two mating surfaces. An abutment 34 is provided on the inside of the roof section 8 and a clamping lock 35 is pivotably mounted thereon. The clamping lock 35 engages a fishplate 36 attached to the sheet metal part 25 of roll yoke 6. The clamping lock 35 includes, for example, an elastic connecting member 36' constructed from rubber or the like and having an expansible section 37. Further, a handle 38 is connected to member 36' by means of a threaded connection. For this purpose, the connecting member 36' is provided with a threaded bushing 39 and the handle 38 includes a threaded lug 40 dimensioned for engagement within bushing 39.

In order to ensure that the clamping lock 35 will remain operable despite damage caused by flaws in the material, inappropriate handling or the like, for example, the elastic connecting member 36' and the handle 38 can additionally be provided with a safety catch, which is not illustrated in detail in the accompanying drawings.

While the present invention has been described with reference to but a single embodiment, it is to be understood that the scope of the invention is not limited to the details thereof, but is susceptible of numerous changes and modifications as would be apparent to one with normal skill in the pertinent technology.

What is claimed is:

1. In an automotive vehicle body having a passenger compartment, a windshield and a supporting frame therefor, self-supporting roll yoke means secured to the vehicle superstructure and spanning said passenger compartment and detachable, substantially rigid roof section means, the improvement comprising means for detachably securing said roof section means along said windshield frame and at said roll yoke means including first tension-locking means for exerting a clamping force between said windshield frame and said detachable roof section means along the length of interconnection therebetween which is effective substantially entirely in a direction parallel to the plane of said roof section means and second tension-locking means for exerting a clamping force between said roll yoke means and said detachable roof section means effective substantially entirely in a direction normal to the plane of said roof section means and permitting relative movement in a plane substantially parallel to said roof section means between said roof section means and said roll yoke means, wherein said windshield frame and said detachable roof section means are provided with mating edge sections for producing an interlocking connection therebetween in response to said first tension-locking means.

2. The improvement according to claim 1, wherein the mating section of said windshield frame includes a rearwardly projecting ridge and the mating section of said roof section means includes a forwardly disposed groove adapted to engage with said ridge and further comprising resilient sealing means interposed between said ridge and said groove when said roof section means is in a secured position.

3. The improvement according to claim 1, wherein said second tension-locking means, which serves to selectively secure said detachable roof section means at said roll yoke means, includes a tensioning member constructed from an elastic material and having a section which is expansible in the direction of the clamping force exerted thereby.

4. The improvement according to claim 3, wherein said tensioning member of said second locking means includes two parts threadedly interconnected.

5. The improvement according to claim 4, wherein said second tension-locking means further includes fishplate means secured to said roll yoke means operable to engage in a locking manner with said tensioning member.

6. The improvement according to claim 1, wherein said first tension-locking means includes a stop member secured to said windshield frame and oriented thereon such that it extends in the direction of said windshield and a tensioning member adapted for selective engagement with said stop member.

7. The improvement according to claim 6, wherein said stop member is constructed in the form of a stamped sheet metal angle.

8. The improvement according to claim 6, wherein said tensioning member is selectively adjustable in length.

9. The improvement according to claim 8, wherein said second tension-locking means, which serves to selectively secure said detachable roof section means at said roll yoke means, includes a tensioning member constructed from an elastic material and having a section which is expansible in the direction of the clamping force exerted thereby.

10. The improvement according to claim 9, wherein said tensioning member of said second locking means includes two parts threadedly interconnected.